United States Patent [19]
Meyers et al.

[11] 3,936,972
[45] Feb. 10, 1976

[54] RODENT TRAP

[76] Inventors: Daniel B. Meyers, 164 Rome St., San Francisco, Calif. 94112; Gary C. Yerby, 78 Lausanne St., No. 2, Daly City, Calif. 94104

[22] Filed: Nov. 20, 1974

[21] Appl. No.: 525,657

[52] U.S. Cl. ................................. 43/69
[51] Int. Cl.² ............... A01M 23/04; A01M 23/12
[58] Field of Search ............................ 43/69

[56] References Cited
UNITED STATES PATENTS

| | | | |
|---|---|---|---|
| 839,448 | 12/1906 | Aschenbrenner | 43/69 |
| 995,233 | 6/1911 | Elder | 43/69 |
| 1,272,974 | 7/1918 | Lycan | 43/69 |
| 1,335,882 | 4/1920 | Drag | 43/69 |
| 1,466,178 | 8/1923 | Lange | 43/69 |
| 1,597,551 | 8/1926 | Stewart | 43/69 |
| 2,706,361 | 4/1955 | Peterson | 43/69 |

FOREIGN PATENTS OR APPLICATIONS

| | | | |
|---|---|---|---|
| 768,378 | 10/1967 | Canada | 43/69 |

*Primary Examiner*—Louis G. Mancene
*Assistant Examiner*—Daniel J. Leach
*Attorney, Agent, or Firm*—Theodore J. Bielen, Jr.; Richard Esty Peterson

[57] ABSTRACT

An animal trap for small animals, such as mice, rats, squirrels, and the like, the trap includes an enclosure over which is arranged a bait compartment with two oppositely-facing tilting bottom panels, each panel being mounted on a pivot in the bait compartment with a base edge having a counterweight, a magnetic means, and a spring mechanism on one side of the pivot positioned proximate to the pivot and with a facing distal edge on an opposite side of the pivot and spaced from the pivot. Two ramps arranged on opposite sides of the bait compartment lead from a ground surface to the base edges of the tilting bottom panels to provide an apparent continuous passage through the animal trap. The counterweights balance the panels, the magnetic means is adapted to retain the panels in a horizontal position with a predetermined force, and the spring mechanism is constructed to return the panels to the horizontal position after tilting.

11 Claims, 7 Drawing Figures

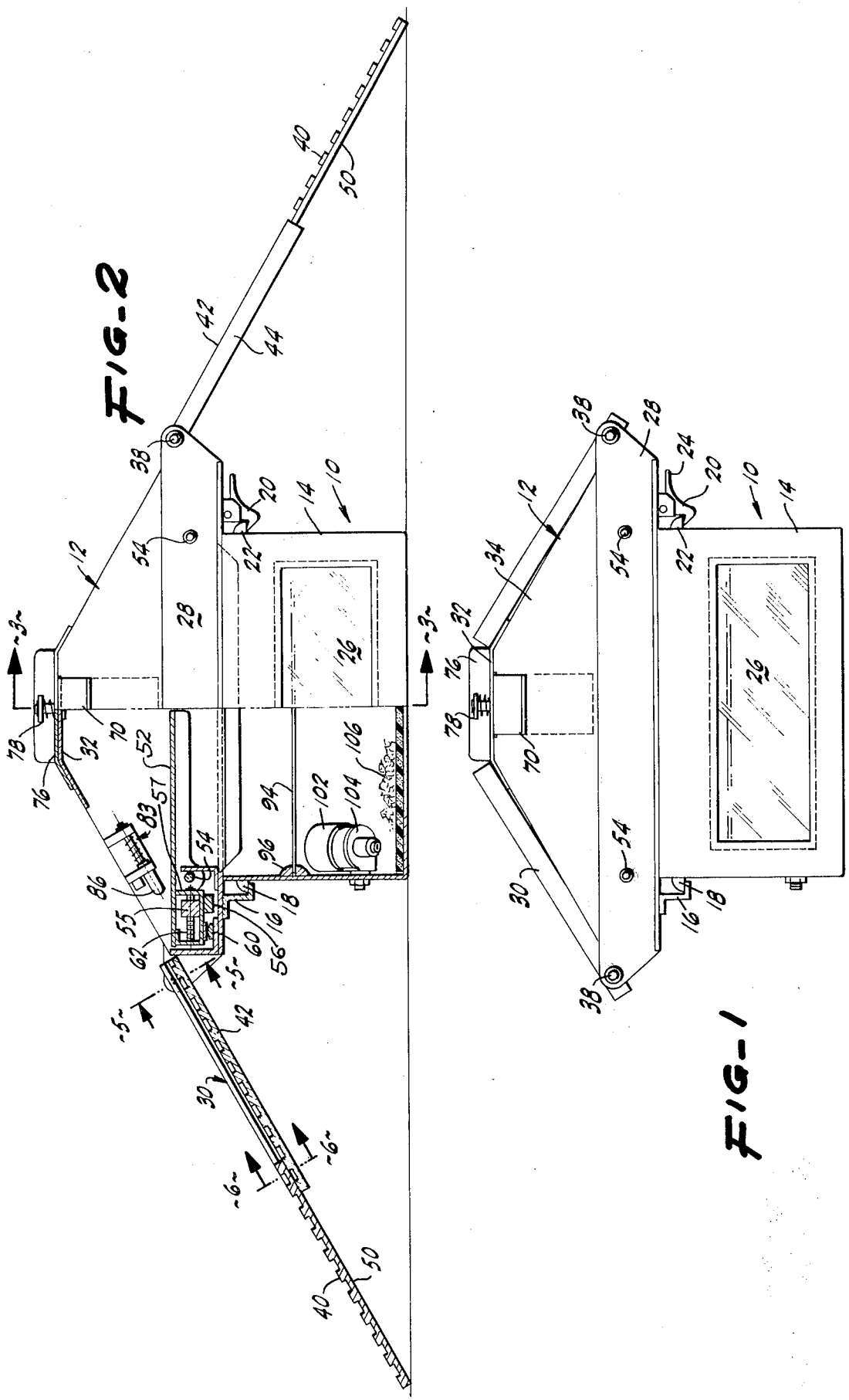

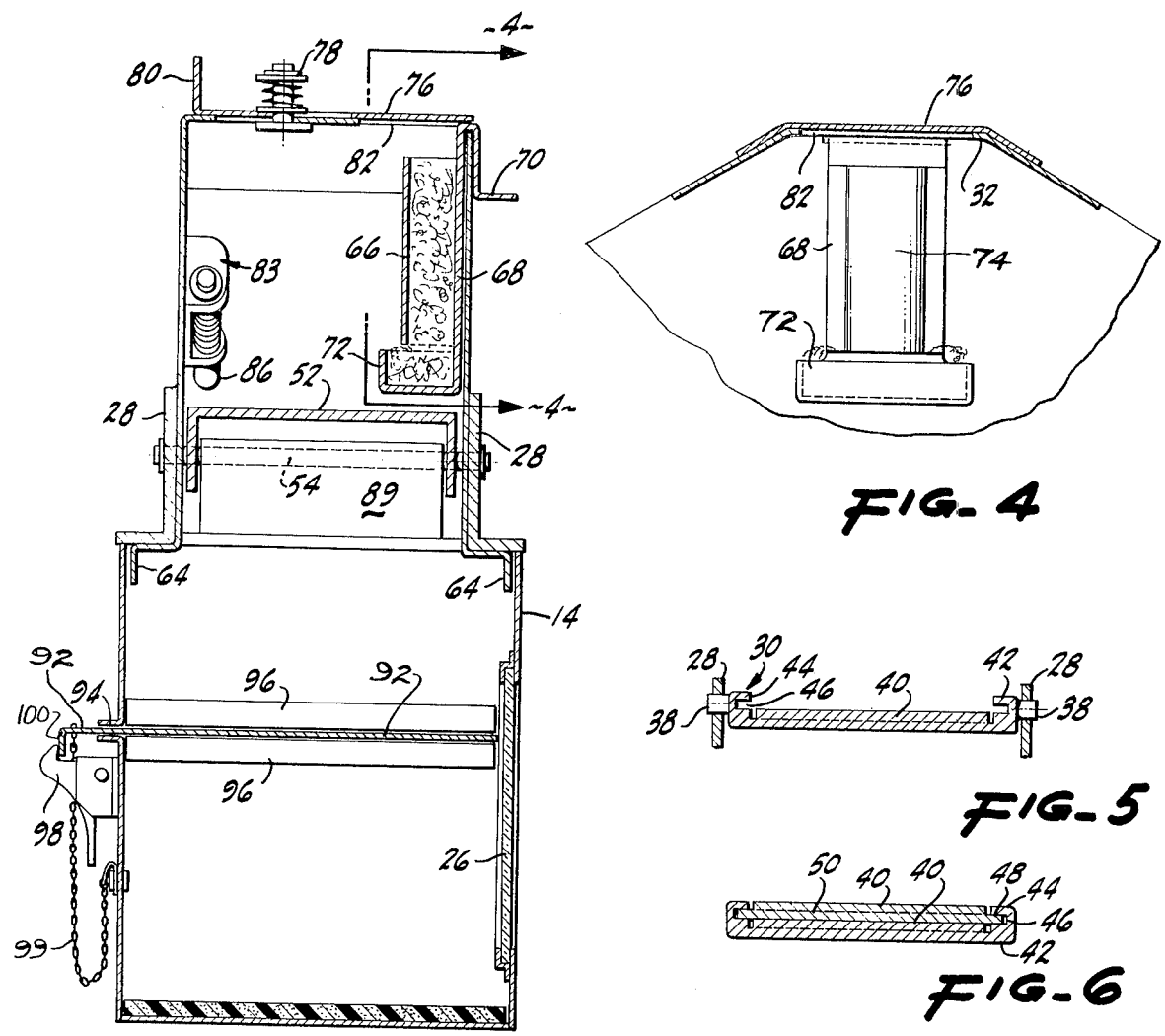
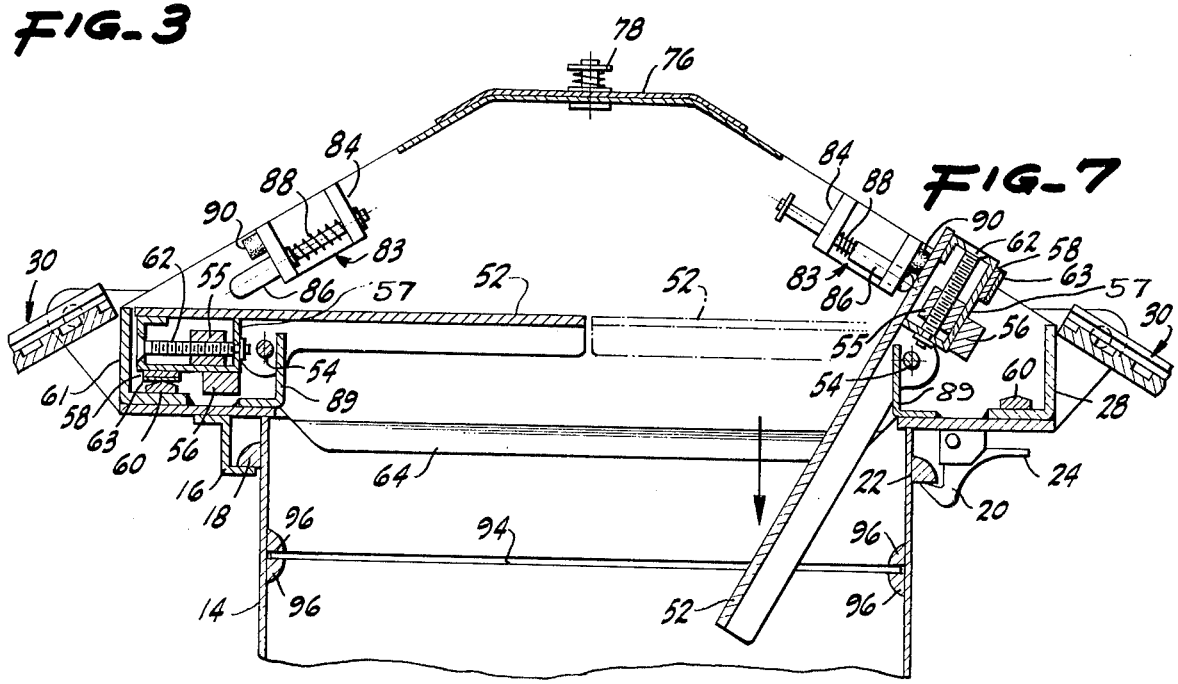

RODENT TRAP

BACKGROUND OF THE INVENTION

The animal trap of this invention is of the trapdoor type and is designed to entrap small animals, such as rodents, in an enclosure by utilizing the weight of the animals to activate a tilting bottom panel in a bait compartment arranged over the enclosure. While the construction and design of the trap are suitable for a wide variety of small animals, it is contemplated that the dimensions and forces required for operation of the trap are alterable according to the particular animal sought to be trapped. For example, the equipment necessary to capture small mice weighing 6 to 8 grams will necessarily be of a smaller scale than that suitable for capturing large rats weighing 1 to 2 pounds.

While trapdoor type animal traps are old in the art, it has been found that conventional counterbalanced tilting panels lack the necessary sensitivity to be fully effective in preventing occasional escape once a rodent senses a tilting of the platform. In general, a counterweight customarily employed to return a platform to its original horizontal position generally provides too great an increment of leverage and occasionally permits a rodent to make his escape. The increment of imbalance necessary to effect a return is particularly significant for the lighter weight rodents and will sometimes exceed the moment of a lightweight rodent at the end of a platform, preventing the platform from tilting.

SUMMARY OF THE INVENTION

The invented animal trap is of the trapdoor type for capturing mice, rats, squirrels, and the like. The trap includes an enclosure over which is arranged an elongated bait compartment containing a food that preferably includes a highly aromatic substance, such as bits of bacon and grain, to lure the rodents to the trap. The bait compartment includes an apparent platform which is formed by two oppositely-facing tilting bottom panels mounted on pivots, enabling the panels to downwardly tilt into the enclosure. The panels are preferably rectangular with a smooth top surface to prevent the rodent from obtaining a foothold to make his escape. Each panel is supported on a pivot that is located both proximate to the end of the bait compartment and proximate to one end of the panel. The other end of each panel is distally spaced from the pivots and centrally located in the bait compartment such that the distal ends of the two oppositely arranged panels are mutually facing.

To achieve a sensitivity to even the weight of the lightest of rodents, an adjustable counterweight and a stationary counterweight are located under the base ends of the panels opposite the distal ends and as close to the point of pivot as possible. The counterweights are adjusted to balance the short length of panel between the pivot and the base end with the relatively long length of platform between the pivot and the distal end. To provide a minimal holding force for maintaining the panels in a preoperative horizontal position, a magnetic means, such as a small permanent magnet, is used in combination with magnetizable material; one of the elements being affixed to the underside of the base end of the panels and the other element being mounted in the bait compartment in juxtaposition to the other element when the panels are horizontally oriented. To minimize the holding force, a nonmagnetizable material may be interposed between the magnet and magnetized elements. For example, one or both of the elements may have a thin, stainless steel plate attached thereto. In achieving a balance or near balance in the panels, the magnetic elements on the panels are included in determining the ultimate weight of the counterweights. The magnetic means provides a holding force that allows a rodent to move substantially beyond the fulcrum or pivot point before the magnetic force is broken and the rodent tipped suddenly into the enclosure. Because the counterweights merely balance and do not provide any substantial return force necessary to return the panel to horizontal, the chances of recovery are greatly minimized. By positioning the counterweights as close to the pivot point as possible, the leverage or moment effect of the counterweights is substantially reduced during tilting since they are displaced partially up over the point of pivot, reducing the moment arm of the counterweight. The downward tilt is thus speeded by the increase in imbalance at the distal end of the panels. Because the counterweights in the preoperative position are positioned below the level of the pivot, the trap operates within a wide range of overall orientation making the trap fully operational on board ships. A spring device is utilized to "bounce" each panel back to its preoperative position. Since the spring device is not engaged until after the tilting of the panel has been initiated, it has no effect on the balance or near balance of the panels in the preoperative position.

The trap operates continuously; capturing numerous rodents without killing them, without resetting of the trap, and requiring only periodic attention to remove the captured rodents. The improved sensitivity of this trap enables the trap to be effective for rodents having a wide range of individual weights.

BRIEF DESCRIPTION OF THE DRAWINGS

FIG. 1 is a front elevational view of the animal trap in collapsed position for convenient transport.

FIG. 2 is an elevational view, partly in cross section, of the animal trap in operational position.

FIG. 3 is a cross-sectional view taken on the lines 3—3 in FIG. 2.

FIG. 4 is a fragmentary cross-sectional view taken on the lines 4—4 in FIG. 3.

FIG. 5 is a cross-sectional view of a ramp taken on the lines 5—5 in FIG. 2.

FIG. 6 is a cross-sectional view taken on the lines 6—6 in FIG. 2.

FIG. 7 is an elevational, cross-sectional view, partially fragmented, illustrating the operation of the animal trap.

DETAILED DESCRIPTION OF THE PREFERRED EMBODIMENT

Referring to FIG. 1, the animal trap, designated generally by the reference numeral 10, is shown in a collapsed position suitable for storage or transport. The animal trap is formed with two main detachable sections: a bait compartment 12 and a box enclosure 14. The bait compartment 12 is mounted on top of the box enclosure 14 and secured thereto by an L-bracket 16 on the underside of one end of the bait compartment 12, which engages a rim strip 18 at the top of one end of the box enclosure 14 and a spring-loaded finger latch 20 on the underside of the other end of the bait compartment 12. The finger latch 20 engages a second rim strip 22 at the top of the other end of the box enclosure 14 to releasably secure the bait compartment 12 to the box enclosure 14. By pressing an extension 24 of the finger latch 20, the bait compartment can be disengaged and separated from the box enclosure 14; for example, when captured rodents in the box enclosure 14 are to be transferred to an exterminator, as described in our copending application entitled "A PORTABLE RODENT EXTERMINATOR," Ser. No. 525,658, filed on Nov. 20, 1974.

To easily detect the presence of captured rodents, the box enclosure 14 is provided with a clear viewing window 26 on the side of the enclosure. The viewing window is preferably a safety glass or clear plastic material to prevent accidental breakage. The viewing window also allows uncaptured rodents to be attracted by the captured rodents in the trap.

The bait compartment 12, as shown in FIG. 1, is formed with a pair of elongated horizontal side supports 28 (one visible in FIG. 1) which extend beyond the ends of the box enclosure when the bait compartment is mounted to the enclosure. At each end of the side supports is pivotally mounted a telescoping ramp 30, here shown collapsed and folded against a top plate 32 joining two trapezoidal sidewalls 34 (one visible in FIG. 1).

Referring to FIG. 2, the ramps 30 can be pivoted and telescoped from the collapsed position, shown in FIG. 1, to the operable position, shown in FIG. 2. In this position, the distal ends of the ramps 30 rest on a ground surface common to the box enclosure 14. The opposite ends on which the ramp structures are pivoted are connected to the ends of the side supports 28 by pins 38. To provide adequate traction for rodents and the like to ascend the ramps, the upper surface of each ramp includes a series of treads 40.

A cross-sectional detail of the ramps is shown in FIGS. 5 and 6. In FIG. 5, the upper section 42 of the ramp 30 is pivotally connected to the side supports by the pivot pins 38. This upper section 42 includes sides 44 having elongated grooves 46 telescopically engaging the edges 48 of the lower section 50, as shown in FIG. 6. The lower section 50 is thus permitted to slide with respect to the upper section 42, providing access to the bait compartment from the ground surface. Preferably, the ramps are non-metallic and constructed of wood or heavy plastic since rodents are adversely sensitive to thin metal surfaces.

As shown in the cross-sectional portion of FIG. 2, the ramp 30 leads to a smooth, tilting bottom panel 52 in the bait compartment 12 which is connected to the side support 28 by pivot pins 54 arranged on each panel proximate to the ramp end. The pivot pins 54 are stainless steel to prevent corrosion. To balance the tilting bottom panel 52, a stationary counterweight 56 is provided on the underside of the panel 52 in an end bracket 57, enabling a major portion and the distal end of the panel 52 to extend over the box enclosure in a horizontal preoperative position. A second counterweight 55, which is adjustable, is arranged on the end bracket and is adjusted as described hereinafter. To retain the tilting bottom panel in the preoperative position, a magnetic element 58 is attached to the underside of the panel end on the end bracket 57, which engages a cooperating magnetic element 60 attached to a cross member 61 in the bait compartment. The magnetic elements 58 and 60 further comprise a stop to prevent movements of the panels from the preoperative position when pressure is applied to the panels at the ramp end. Preferably, the magnetic element 58 on the panel comprises a steel pad and the magnetic element 60 on the cross member comprises a permanent magnet having a pyrimidal cross section with a rounded top to provide a uniform and proper contact, even after long use and rough handling. For proper balance, the weight of the magnetic element 58 is included in the weight of the counterweights 55 and 56. To adjust the retaining force of the magnetic elements, the magnetizable element 58 includes a stainless steel plate 63. In this manner, a relatively weak holding force sufficient to retain the balanced bottom panel in the preoperative position is achieved, allowing a sudden release for even the lightest of rodents seeking bait in the bait compartment.

An accurate balance in the bottom panels is preferred for a most efficient operation of the trap. However, a very minimal imbalance in favor of the shorter distal end may be present. In this manner, a rodent that has passed the fulcrum point at the pivot pins 54 will suddenly plunge into the box enclosure when the weak magnetic retaining moment is exceeded. A rodent tilted into the enclosure is unable to recover because there is no assist from a substantial imbalance in the panel, customarily present in prior art devices, to return the panel to the preoperative position. In fact, the location of the counterweights causes any return force to diminish in effect as the platform tilts. To adjust the counterweights 55, the adjustment screws 62, pivotally attached to the end brackets 57 under the panel 52 and threadably engaged with the counterweights, are turned to displace the counterweights 55 forward or backward in the end brackets, thus altering the effective moment of the weights. In this manner, the sensitivity of the panels can be adjusted for larger or smaller rodents.

In the present embodiment, after tilting has been initiated, a spring mechanism 83 engages a tilted bottom panel to return the panel to the preoperative position, as described in greater detail with reference to FIG. 7.

With reference to FIG. 3, the interior of the bait compartment 12 and its arrangement over the box enclosure is illustrated. The side supports 28 of the bait compartment are L-shaped to provide a seat on the peripheral top rim of the box enclosure 14. The trapezoidal sidewalls 34 have a depending peripheral edge 64 which inserts within the box enclosure 14 to properly locate the bait compartment on the enclosure.

Mounted from the top center of one of the trapezoidal sidewalls 34 is a bait container 66. The container, which is also shown in FIG. 4, is formed with a backplate 68 bent over the top of the sidewall 34, forming a tab 70 for removal of the container 66 from the compartment. The bottom of the backplate 68 is formed into a receptacle 72 and, against the backplate 68, is a storage tube 74 for depositing a quantity of bait into the receptacle 72. To replenish the bait container or to remove stale bait, a sliding cover plate 76 is mounted against the top plate 32 of the bait compartment by a spring pin 78 which maintains the cover plate against the top plate but permits it to slide when manipulated by a tab 80 on the cover plate exposing an opening 82 in the top plate through which the bait container can be withdrawn.

Since the bait compartment is arranged with two opposite paths of access to the bait container, a rodent approaching the compartment from either of the opposite ramps will gain a sense of security when it perceives the apparent opposite means of escape through the bait compartment. The rodent will thus approach the bait container with less caution than if the container were located at the end of a dead-end passage.

Referring to FIG. 7, the spring mechanism 83 is arranged such that it is displaced from the panels and is engageable only after tilting has been initiated. The spring mechanism 83 includes a bracket 84 attached to one of the trapezoidal sidewalls 34, a plunger 86, and a small compression spring 88 contacting the bracket at one end and the plunger at the opposite end. A small rubber stop 90 provides a limit to the downward tilt of a panel. For example, referring to the downwardly tilting panel 52, schematically shown in FIG. 7, the plunger 86 is engaged with the top surface of the panel 52 and is retracted, compressing the spring 88 by action of the top surface of the panel against the end of the plunger. When the stop 90 is contacted by the top surface of the tilting panel 52, the panel has reached its maximum downward tilt and is subsequently returned by action of the potential energy stored in the compressed spring which expands the spring 88 after the rodent is deposited in the box enclosure. While the panels 52 are in both the preoperative position and the tilt position, a cross shield 89, arranged under the panels, prevents captured rodents from escaping under the panels.

When it is desired to empty the box enclosure of captured rodents, a slide plate 92, shown in FIG. 3, may be inserted through a slot 94 in the side of the box enclosure, shown also in FIG. 7. The slide plate 92 is positioned by guide rails 96 such that it encloses the lower portion of the box enclosure, thereby confining captured rodents when the bait compartment is removed from the enclosure. To prevent accidental opening of the slide plate 92, a spring-loaded finger latch 98 is mounted on the box enclosure. The finger latch 98 engages a tab 100 on the end of the slide plate, securing the plate in the enclosure. The slide plate 92 is connected to the box enclosure by a chain 99 to prevent its loss when not in use during active operation of the trap.

It is preferred that the captured rodents be maintained alive and annihilated in a cooperating auxiliary exterminator, as described and referenced hereinbefore.

The lower portion of the box enclosure preferably includes a liquid bottle 102 mounted to the inside wall of the enclosure by a bracket 104 and includes food 106, as shown in FIG. 1, in order that captured rodents do not become distressed and signal other rodents, preventing them from approaching the trap. Flea powder may be added to the box enclosure to kill fleas on the captured rodents. Both the captured, live rodents and collected fleas are contained in the enclosure for subsequent disposal or laboratory examination. Additionally, it is preferred that the trap be painted a dull, neutral color which rodents appear to prefer. Since the operation of the trap is virtually noiseless, rodents continuously approach the trap without fear and, as noted, may be attracted by seeing already captured rodents through the viewing window.

The trap is designed to operate effectively within a wide range of angular orientations, making it particularly useful on board ships.

While in the foregoing specification an embodiment of the invention has been set forth in considerable detail for the purposes of making a complete disclosure thereof, it will be apparent to those skilled in the art that numerous changes may be made in such details without departing from the spirit and principles of the invention.

What is claimed is:

1. An animal trap for rodents and the like comprising: an enclosure having an open top; and, a bait compartment adapted to be coupled to, and arranged over, the open top of said enclosure, said bait compartment comprising a support structure for supporting said bait compartment over said enclosure; at least one tilting bottom panel having pivot means pivotally connected to said support structure for pivoting said panel from a first horizontal preoperative position over said enclosure to a second tilted operative position directed into said enclosure, said panel having a first end proximate to said pivot means and a second end distal to said pivot means, said panel having further mounted to said first end of said panel adjacent said pivot means first magnetic means and counterweight means for substantially balancing said panel at said pivot means, said panel and a substantial portion of said counterweight means being arranged above said pivot means when said panel is in said preoperative position; and, second magnetic means mounted to said support structure cooperatively arranged with said first magnetic means for retaining said panel in said preoperative position with a predetermined magnetic force; wherein said panel is displaced from said horizontal preoperative position to said tilted operative position by the moment of the rodent's weight on said panel, overcoming the retentive force of said two cooperating magnetic means, said counterweight means having an effective moment, opposite to the moment of a rodent's weight, which effective moment is substantially reduced when said panel is displaced from said preoperative position to said operative position.

2. The animal trap of claim 1 wherein said counterweight means has further means for adjusting the effective moment of said counterweight means in said preoperative position.

3. The animal trap of claim 1 wherein said bait compartment comprises further, return means connected to said support structure and engageable with said bottom panel of said bait compartment after a tilt of said panel has been initiated for returning said panel from a tilted operative position to a horizontal preoperative position.

4. The animal trap of claim 3 wherein said return means comprises a spring mechanism having a bracket mounted to said support structure, a plunger mounted in said bracket, said plunger having an end displaced from said panel when said panel is in said horizontal position and engageable and displaceable with said panel when said panel is in said tilted position, and a compression spring arranged between said plunger and said bracket, said compression spring being compressed when said plunger is engaged and displaced by said panel.

5. The animal trap of claim 3 wherein said bait compartment includes two bottom panels oppositely arranged in said support structure with second ends in facing juxtaposition centrally located over said enclosure.

6. The animal trap of claim 5 wherein said bait compartment and said enclosure have cooperating latching means for releasably securing said bait compartment to said enclosure.

7. The animal trap of claim 5 wherein said bait compartment includes a bait container attachable to said support structure proximate to the second ends of said bottom panels.

8. The animal trap of claim 5 wherein said enclosure includes a window adapted to view the inside of said enclosure.

9. The animal trap of claim 5 wherein said enclosure has further guide means for insertion of a shield to enclose at least a portion of said enclosure, and a guide shield insertable in said guide means.

10. The animal trap of claim 5 wherein said bait compartment includes access means for providing an access path for rodents to the first ends of said panels.

11. The animal trap of claim 10 wherein said access means comprises a pair of ramps adapted to lead from a ground surface to the first ends of said panels.

* * * * *